(12) United States Patent
Kimura et al.

(10) Patent No.: US 9,284,716 B2
(45) Date of Patent: Mar. 15, 2016

(54) WORK VEHICLE

(71) Applicant: KOMATSU LTD., Tokyo (JP)

(72) Inventors: Naoki Kimura, Komatsu (JP);
Masahiko Hamaguchi, Nomi (JP);
Takanori Yamahata, Komatsu (JP); Shu Ishida, Komatsu (JP); Hidenori Tatsuta, Awara (JP)

(73) Assignee: KOMATSU LTD., Tokyo (JP)

( * ) Notice: Subject to any disclaimer, the term of this patent is extended or adjusted under 35 U.S.C. 154(b) by 112 days.

(21) Appl. No.: 14/351,290

(22) PCT Filed: May 8, 2013

(86) PCT No.: PCT/JP2013/062902
§ 371 (c)(1),
(2) Date: Apr. 11, 2014

(87) PCT Pub. No.: WO2014/181392
PCT Pub. Date: Nov. 13, 2014

(65) Prior Publication Data
US 2015/0252553 A1    Sep. 10, 2015

(51) Int. Cl.
*E02F 9/08* (2006.01)
*B62D 27/06* (2006.01)
*E02F 3/76* (2006.01)
*E02F 9/16* (2006.01)
*E02F 9/20* (2006.01)
*B62D 33/073* (2006.01)

(52) U.S. Cl.
CPC .............. *E02F 9/0858* (2013.01); *B62D 27/06* (2013.01); *B62D 33/073* (2013.01); *E02F 3/764* (2013.01); *E02F 3/765* (2013.01); *E02F 3/7645* (2013.01); *E02F 3/7654* (2013.01); *E02F 9/166* (2013.01); *E02F 9/2012* (2013.01); *E02F 9/2004* (2013.01); *Y10T 29/49817* (2015.01)

(58) Field of Classification Search
CPC .. B62D 25/2009; B62D 27/06; B62D 27/065; B62D 33/06; B62D 33/0621; B62D 33/077; E02F 9/08; E02F 9/0808; E02F 9/0858; E02F 9/10; E02F 9/16; E02F 9/166
USPC ....................................... 296/190.01, 190.04
See application file for complete search history.

(56) References Cited

FOREIGN PATENT DOCUMENTS

| JP | 2002-115267 A | 4/2002 |
|---|---|---|
| JP | 2005-290928 A | 10/2005 |
| JP | 2007-154453 A | 6/2007 |
| JP | 2012-57439 A | 3/2012 |

OTHER PUBLICATIONS

The International Search Report for the corresponding international application No. PCT/JP2013/062902, issued on Aug. 13, 2013.

*Primary Examiner* — Jason S Daniels
(74) *Attorney, Agent, or Firm* — Global IP Counselors, LLP

(57) ABSTRACT

A box section of a cab is detachable in a motor grader. The motor grader is provided with a bracket and a first controller. The bracket is attachable to a floor section. The first controller is attachable in a selective manner to the box section and the bracket and controls equipment required for travel.

20 Claims, 12 Drawing Sheets

WORK VEHICLE

CROSS-REFERENCE TO RELATED APPLICATIONS

This application is a U.S. National stage application of International Application No. PCT/JP2013/062902, filed on May 8, 2013.

FIELD OF THE INVENTION

The present invention relates to a work vehicle.

A controller for controlling equipment (e.g., the transmission) required for travel of a work vehicle is generally stored inside a console box, such as the one illustrated in FIG. 2 in Japanese Patent Laid-open No. 2002-115267. However, in recent years, a plurality of the abovementioned controllers are provided in work vehicles due to advances in the use of electronics for controlling various types of equipment. For example, two controllers including a controller for controlling the transmission and a controller for controlling a monitor inside the cab may be installed. A controller may need to be installed on a rear wall within the cab, for example, because it may be difficult to store the controllers inside the console box if there is more than one controller.

SUMMARY

Container transportation, in which a work vehicle is stored inside a container for transportation, is used when exporting a work vehicle, such as a motor grader overseas. Because the size of a container is determined according to international standards, a work vehicle that cannot be stored inside a container due to the size of the vehicle may need to be stored inside a container in a state in which the box section of the cab is detached as illustrated in FIG. 2 in Japanese Patent Laid-open No. 2002-115267.

However, when a controller is attached to the box section of the cab as described above, there is a problem that travel of the work vehicle is impossible because the controller is detached when the box section is detached and operating efficiency for storing the work vehicle inside the container is reduced.

An object of the present invention is to enable travel of the work vehicle even when the box section is detached.

A work vehicle according to a first aspect of the present invention is a work vehicle with a detachable box section in a cab that has a box section with a lower surface that is open and a floor section that closes the lower surface of the box section. The work vehicle is provided with a first controller and an attachment member. The first controller is attachable to the box section and controls equipment required for travel. The attachment member is attachable to the floor section. The first controller is attachable to the attachment member.

According to this configuration, the work vehicle has an attachment member that is attachable to the floor section and the first controller is attachable to the box section and also attachable to the attachment member. As a result, the first controller may be attached to the box section in a state in which the box section is attached to the work vehicle. As a result, a plurality of controllers required for travel of the work vehicle may be provided regardless of the storage capacity of the console box.

Moreover, if the box section is detached, the attachment member is attached to the floor section and the first controller may be detached from the box section and attached to the attachment member. As a result, travel of the work vehicle is enabled even when the box section is detached. Consequently, work to store the work vehicle in a container may be performed easily. While travel of the work vehicle is enabled by merely detaching the first controller from the box section and placing the first controller near the driver seat, there is a concern that the first controller may be damaged due to vibration when travel. Thus, according to the work vehicle configured as described above, damage to the first controller due to the effect of vibration may be prevented because the first controller is attached to the attachment member.

The work vehicle preferably is further provided with a base member to which the first controller may be attached. The first controller is attached to the attachment member or to the box section via the base member.

According to this configuration, relays and fuses and other types of electronic components incidental to the first controller as well as the first controller itself may be attached to the base member. As a result, the first controller and the electronic components incident to the first controller may be reattached by simply reattaching the base member and thus work efficiency may be improved.

The attachment member preferably has a first member and a second member. The first member is attachable to the floor section. The second member has a plate-like body section and has at least two attachment parts for attachment with the base member. The second member is attachable to the first member. The attachment parts for attachment with the base member are provided with a gap therebetween.

According to this configuration, the attachment member is configured of the first member and the second member. By dividing the attachment member into at least two members in this way, the handling characteristics of the members may be improved and, consequently, work efficiency when attaching the second member to the base member is improved. Positioning of the second member is simple since the attachment parts for attachment with the base member are provided with a gap therebetween. By providing another attachment part and disposing the other attachment part with a gap between the other attachment part in the height direction, the attachment of the second member and the base member may be performed in a more stable manner.

The second member is preferably attached to the first member with fastening members. According to this configuration, work for attaching and detaching the second member and the first member may be performed more easily.

The second member preferably has a gripping part provided on the body section. According to this configuration, work efficiency when detaching the base member from the box section and when attaching the base member to the attachment member is improved. Specifically, when attaching the second member to the base member provided in the box section and attaching the second member having the base member attached thereto to the first member, a worker is able to perform work while gripping the gripping part to hold the second member.

The gripping part preferably extends from the body section toward the base member and is coupled to the base member at a distal end part.

According to this configuration, because the gripping part extends between the body section of the second member and the base member, a gap between the body section of the second member and the base member is maintained. As a result, damage due to the first controller fixed on the base member or to a harness extending from the first controller colliding with the body section of the second member and the like may be prevented even if vibration occurs due to travel of the work vehicle.

The first member preferably has a body section that is tilted forward when attached to the floor section. Generally, a lower end part of the rear wall of the box section is configured to project forward. As a result, when lifting the box section upward to detach the box section, the lower end part of the box section may interfere with the base member attached to the attachment member. However, by allowing the body section of the first member to be tilted forward as described above, interference between the lower end part of the box section and the base member may be avoided.

One of the first member and the second member preferably has a first engaging part for engaging the first member or the second member with the other member. According to this configuration, work to attach or detach the second member to or from the first member may be made easier because the second member may be temporarily fastened to the first member with the first engaging part.

A second controller for controlling equipment required for travel is preferably provided, and the first member preferably has a holding part for holding the second controller.

The first member preferably has a seat. According to this configuration, a worker may sit on the seat of the first member and drive the work vehicle even when a seat originally attached to the floor section is detached and the attachment member is installed.

The base member preferably has a second engaging part for engaging with the box section. According to this configuration, the base member may be temporarily fastened to the box section with the second engaging part when the base member is detached from the attachment member and attached to the box section. As a result, work when attaching the base member to the box section may be performed easily.

The base member preferably is attached to the attachment member with fastening members. According to this configuration, work for attaching and detaching the base member to and from the attachment member may be performed more easily. Consequently, work for attaching the base member to the attachment member may be performed more easily when storing the work vehicle in a container. Moreover, work for detaching the base member from the attachment member and attaching the base member to the box section may be performed more easily when performing normal work with the work vehicle.

The attachment member is preferably attached to the floor section with fastening members. According to this configuration, work for attaching and detaching the attachment member to and from the floor section may be performed more easily. Consequently, work to detach the seat from the floor section and attach the attachment member to the region where the seat was attached to the floor section may be performed more easily when storing the work vehicle in a container. Moreover, work to detach the attachment member from the floor section in order to attach the seat to the floor section may be performed more easily when performing normal work with the work vehicle.

A work vehicle according to a second aspect of the present invention is provided with a cab, a seat, a first controller and a base member. The cab has a box section and a floor section. The box section has a lower surface that is open. The floor section closes the lower surface of the box section. The seat is installed in a detachable manner on the floor section. The first controller controls equipment required for travel. The first controller may be attached to the base member, and the base member is detachably attached to a rear wall of the box section inside the cab. The seat may be detached from the floor section, and the attachment member may be attached to a region where the seat was detached. The base member has an attachment part for attaching the base member to the attachment member.

According to this configuration, a plurality of controllers required for travel of the work vehicle may be provided regardless of the storage capacity of a console box because the base member to which the first controller is attached is attached to the rear wall of the box section. Moreover, the seat may be detached from the floor section and the attachment member may be attached to the floor section, and the base member has an attachment part for attachment to the attachment member. As a result, when the box section of the cab is detached, the box section may be detached from the base member and the base member may be attached to the attachment member, and thus the work vehicle is able to travel even when the box section is detached. Consequently, work to store the work vehicle in a container may be performed easily.

The base member preferably is attached to the rear wall of the box section with fastening members. According to this configuration, the base member may be easily attached to or detached from the rear wall of the box section. As a result, the base member attached to the box section may be easily detached from the box section when detaching the box section to store the work vehicle in a container. Moreover, the base member may be easily attached to the rear wall of the box section when the box section is attached to perform normal work with the work vehicle.

The work vehicle is preferably further provided with a console box and a second controller. The console box is disposed beside the seat and is provided with a shift lever. The second controller is disposed to the rear of the console box and controls equipment required for travel. Moreover, the second controller is attached in a detachable manner to the rear wall of the box section inside the cab.

A method according to a third aspect of the present invention enables travel of a work vehicle in a state in which the box section is detached. The work vehicle is provided with a cab, a seat, a first controller, and a base member. The cab has a box section having a lower surface that is open, and a floor section that closes the lower surface of the box section. The seat is installed in a detachable manner on the floor section. The first controller controls equipment required for travel. The first controller may be attached to the base member, and the base member is detachably attached to a rear wall of the box section inside the cab. The method according to the third aspect of the present invention includes a step for detaching the seat, a step for attaching an attachment member to the floor section from which the seat was detached, a step for detaching the base member from the rear wall of the box section, a step for attaching the detached base member to the attachment member, and a step for detaching the box section after the base member has been detached.

According to this method, the base member having the first controller required for travel attached thereto is attached to the attachment member, that is, a state is produced in which the first controller remains in the work vehicle even when the box section is detached. As a result, travel of the work vehicle is enabled even when the box section is detached. Consequently, because travel of the work vehicle is enabled even when the box section is detached for storage inside a container for example, work efficiency for storing the work vehicle inside the container may be improved.

According to the present invention, travel of the work vehicle is enabled even when the box section has been detached.

DETAILED DESCRIPTION OF EXEMPLARY EMBODIMENTS

Figure 1:
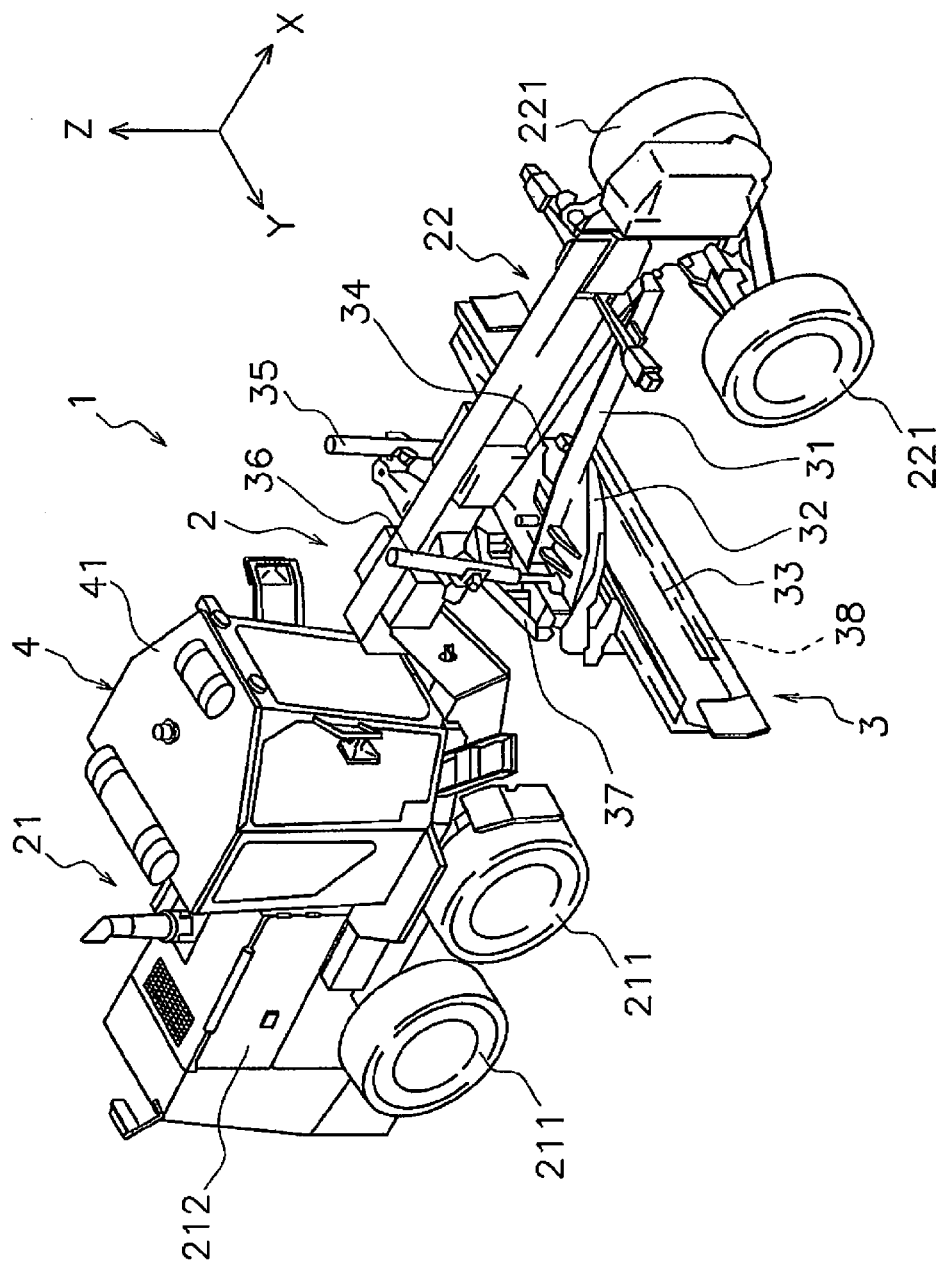
FIG. 1 is an external perspective view of a motor grader.
Figure 2:
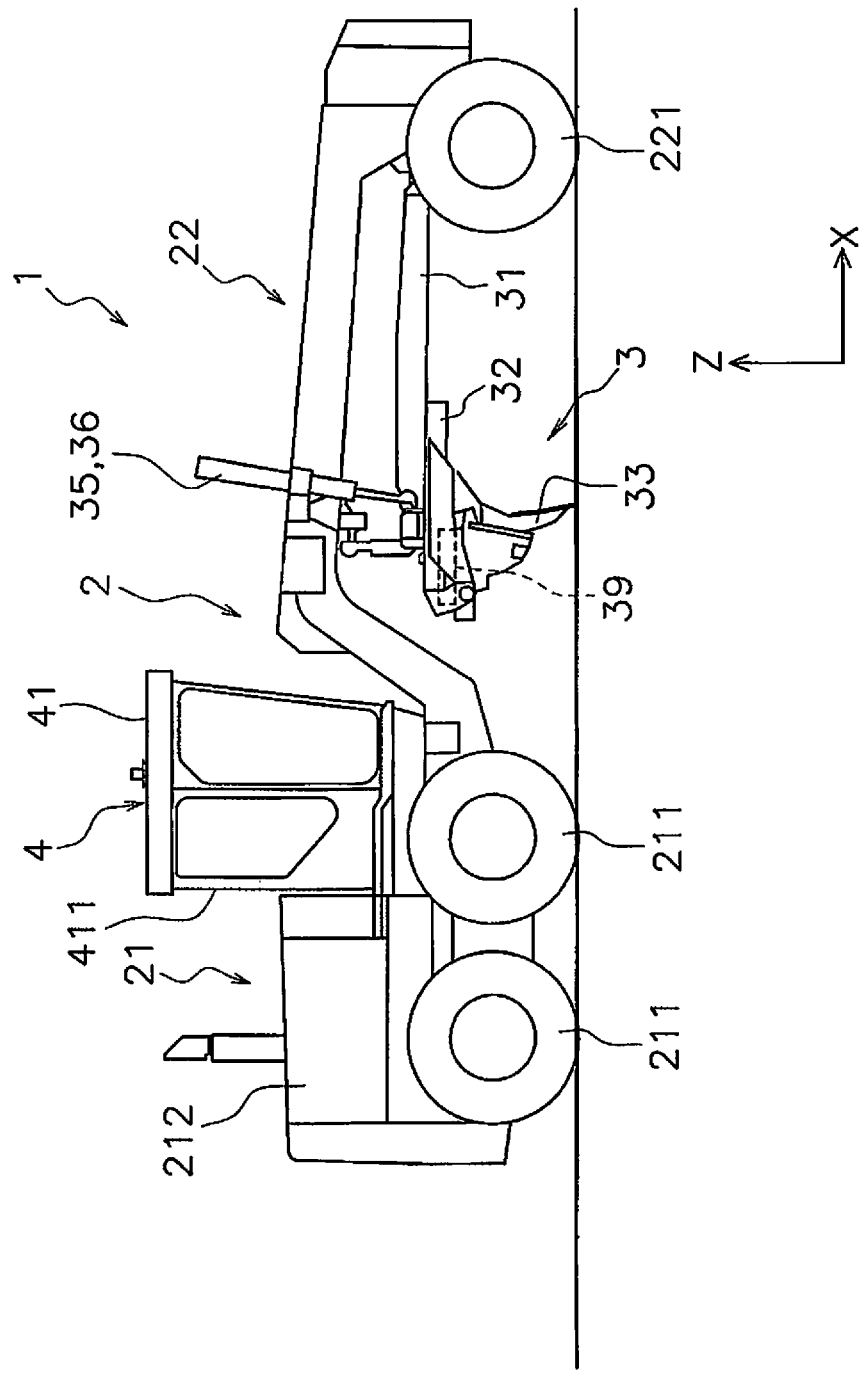
FIG. 2 is a side elevational view of a motor grader.

An exemplary embodiment of a motor grader 1 as an example of a work vehicle according to the present invention will be explained below with reference to the drawings. FIG. 1 is an external perspective view of the motor grader 1 and FIG. 2 is a side elevational view of the motor grader 1. In the following explanation, "front" and "rear" refer to the front and the rear of a vehicle body 2. That is, the right side is the "front" and the left side is the "rear" in FIG. 2. In the following description, "right," "left," "up," and "down" indicate directions relative to a state of looking forward from the driver's seat, and "vehicle width direction" and "left-right direction" have the same meaning. In the drawings, the front-back direction is depicted as the X axis, the crosswise direction is depicted as the Y axis, and the vertical direction is depicted as the Z axis.

As illustrated in FIGS. 1 and 2, the motor grader 1 is provided with the vehicle body 2, a work implement 3, and a cab 4. The motor grader 1 is able to perform spreading and grading work, snow removal work, light cutting or material blending with the work implement 3.

The vehicle body 2 includes a rear vehicle body 21 and a front vehicle body 22. The rear vehicle body 21 has a plurality of (e.g., four) rear wheels 211. The motor grader 1 travels due to rotation of the rear wheels 211 due to driving power from an engine (not illustrated). The engine is housed inside an engine compartment 212 in the rear vehicle body 21. A torque converter and a transmission and the like (not illustrated) are housed inside the engine compartment 212. The torque converter is connected to the output side of the engine and transmits power from the engine to the transmission. The transmission is connected to the output side of the torque converter. The transmission has a clutch and a shift gear and the like (not illustrated), and transmits power from the engine to the rear wheels 211 through a final speed reduction gear and a tandem device (not illustrated).

The front vehicle body 22 is disposed in front of the rear vehicle body 21. The front vehicle body 22 has a plurality of (e.g., two) front wheels 221. The front wheels 221 are disposed in the front section of the front vehicle body 22.

The work implement 3 has a drawbar 31, a circle 32, a blade 33, a hydraulic motor 34, and various types of hydraulic cylinders 35 to 39. The various types of hydraulic cylinders 35 to 39 include lift cylinders 35 and 36, a drawbar shift cylinder 37, a blade shift cylinder 38, and a tilt cylinder 39 (see FIG. 2). The hydraulic motor 34 and the hydraulic cylinders 35 to 39 are driven by hydraulic fluid from a hydraulic pump (not illustrated).

A front section of the drawbar 31 is attached in a swingable manner to the front section of the front vehicle body 22. The pair of lift cylinders 35 and 36 raises and lowers the rear section of the drawbar 31 by expanding or contracting in synchronization. The drawbar 31 swings around a shaft in the front-back direction due to the different extension and contraction of the lift cylinders 35 and 36. Moreover, the drawbar 31 moves to the left and right due to the extension and contraction of the drawbar shift cylinder 37.

The circle 32 is attached in a rotatable manner to the rear section of the drawbar 31. The circle 32 is driven by the hydraulic motor 34 (see FIG. 1). As a result, the circle 32 rotates in the clockwise direction or the anti-clockwise direction with respect to the drawbar 31 as seen from above the vehicle.

The blade 33 is supported in a manner that allows sliding in the left-right direction with respect to the circle 32. The blade 33 is supported in a manner that allows sliding around a horizontal shaft in the left-right direction with respect to the circle 32. The blade 33 moves to the left and right of the circle 32 due to the blade shift cylinder 38. The blade 33 swings around a horizontal shaft in the left-right direction of the circle 32 due to the tilt cylinder 39 (see FIG. 2). As described above, the blade 33 is able to move up and down, change the tilt in the front-back direction, change the tilt in the left-right direction, rotate, and shift in the left-right direction via the drawbar 31 and the circle 32.

Figure 3:
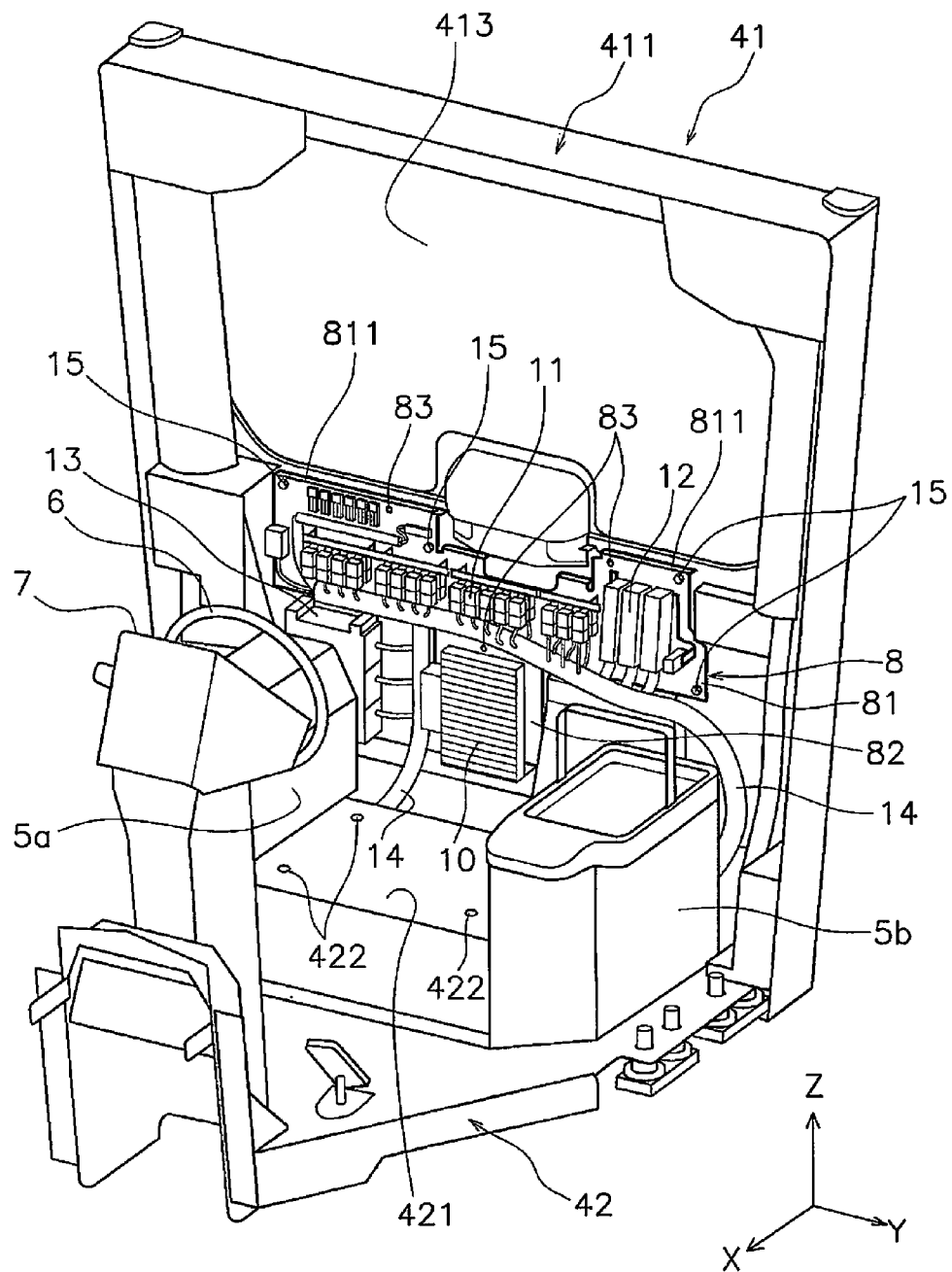
FIG. 3 is a perspective view of the inside of a cab.
Figure 4:
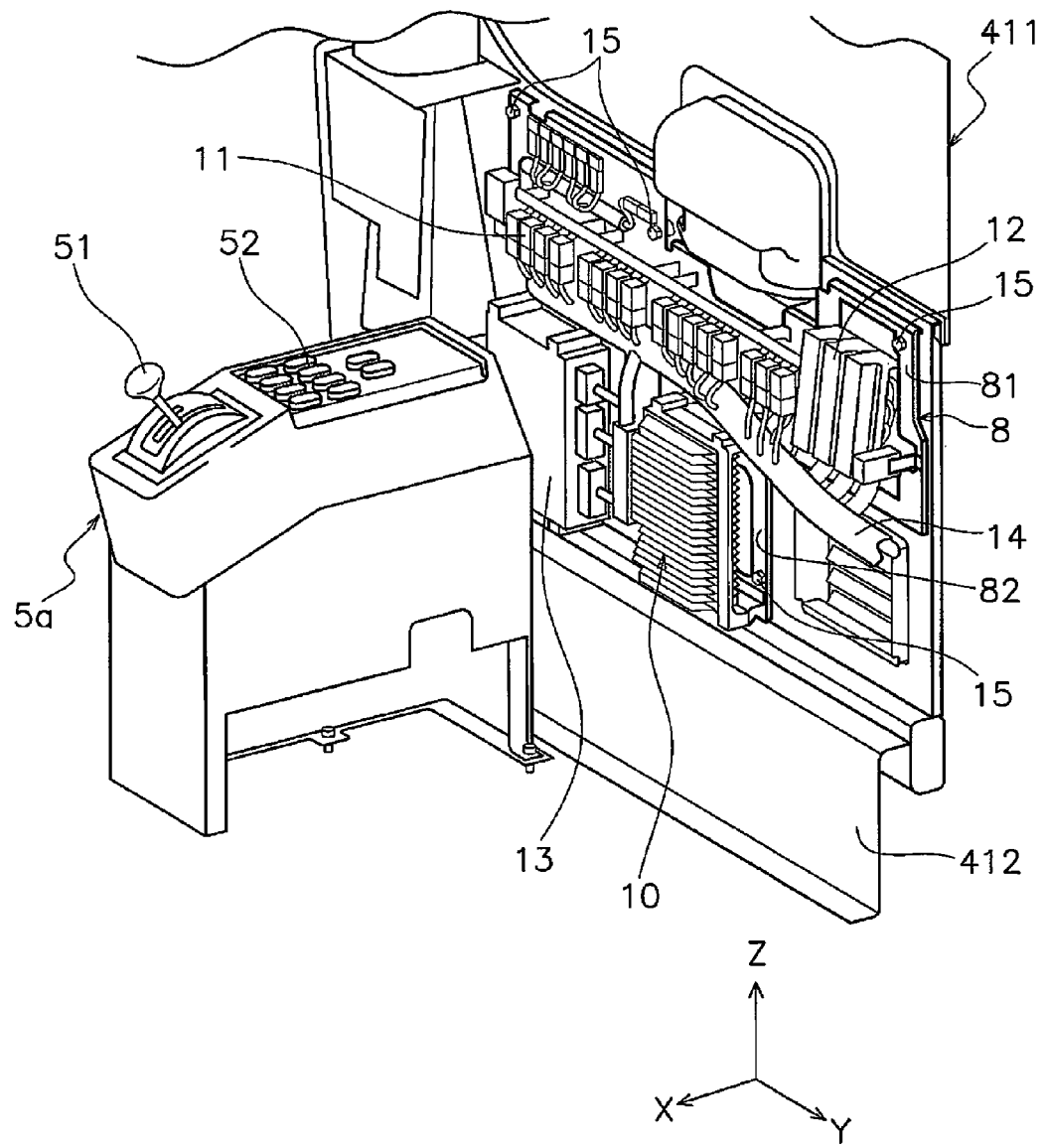
FIG. 4 is a perspective view illustrating details around a lower end part on a rear wall of a box section.

FIG. 3 is a perspective view illustrating the inside of the cab 4 as seen from the left front. For ease of explanation, only a rear wall 411 of a box section 41 is illustrated in FIG. 3 and the description of a seat is omitted. The cab 4 is provided on the front vehicle body 22. The cab 4 may be provided on the rear vehicle body 21. As illustrated in FIG. 3, the cab 4 has the box section 41 and a floor section 42. The box section 41 has a box shape and the lower surface thereof is open (see FIGS. 1 and 2), and the box section 41 is attached to the floor section 42 in a detachable manner. Specifically, the box section 41 is attached to the floor section 42 with fastening members, such as bolts and the like. The box section 41 has the rear wall 411 that defines the rear surface of the cab 4. The rear wall 411 has in an upper part thereof a window 413 for checking to the rear from the inside of the cab 4. The rear wall 411 is configured so that a lower end part 412 projects forward as illustrated in FIG. 4. As a result, a below-mentioned base member 8 and electronic components, such as a first controller 10, fixed to the base member 8 are positioned above the lower end part 412 of the rear wall 411. FIG. 4 is a perspective view illustrating details around the lower end part 412 on the rear wall 411 of the box section 41.

Figure 5:
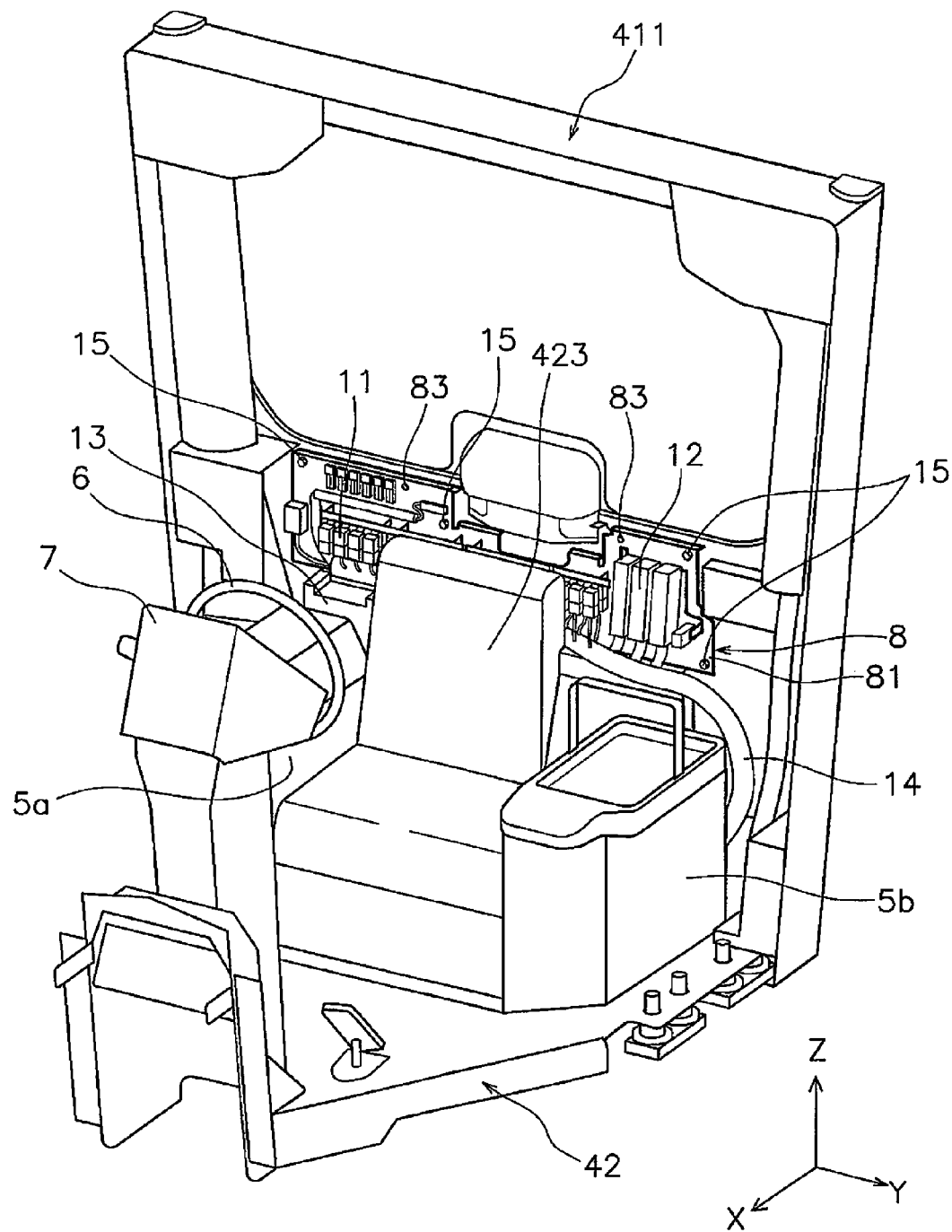
FIG. 5 is a perspective view of the inside of the cab with a seat attached.

As illustrated in FIG. 3, the floor section 42 is a portion that defines the lower surface of the cab 4 and closes the lower surface of the box section 41. The floor section 42 is attached to the front vehicle body 22. The floor section 42 may be attached to the rear vehicle body 21. The floor section 42 has a seat section 421 formed to be positioned a step higher than other portions. A plurality of threaded holes 422 are formed in the seat section 421 and fastening members, such as bolts 16, are screwed into the threaded holes 422 to attach a seat to the seat section 421. As a result, a seat 423 is attached onto the seat section 421 in a detachable manner as illustrated in FIG. 5.

As illustrated in FIG. 3, first and second console boxes 5a and 5b, a handle 6, and a display device 7 are installed on the floor section 42. The first console box 5a is disposed on the right side of the seat section 421, that is, the right side of the seat 423, and a shift lever 51 and light switches 52 are installed on the first console box 5a (see FIG. 4). An operating lever (not illustrated) is disposed beside the handle 6 and the work implement 3 may be moved by operation of the operating lever.

The base member 8 is attached to a lower part of the rear wall 411 of the box section 41. Specifically, the base member 8 is attached to the rear wall 411 in a detachable manner with fastening members, such as a plurality of bolts 15. The base member 8 is a plate-like member and is approximately formed in a T-shape. Specifically, the base member 8 has an upper plate 81 that extends in the left-right direction, and a lower plate part 82 that extends in the vertical direction, and the upper plate part 81 and the lower plate part 82 are formed in an integrated manner. The base member 8 is formed with a plurality (e.g., three) of threaded holes 83 (example of attachment parts) for attaching the base member 8 to a below-mentioned second bracket member 92.

Electronic components, such as a plurality of relays 11 and fuses 12, are fixed to the upper plate part 81. An upper edge part 811 (example of a second engaging part) of the upper plate part 81 is folded to the rear and is configured to be hung on a convex part (not illustrated) that extends in the left-right direction formed on the rear wall 411.

A first controller 10 is fixed to the lower plate part 82. The first controller 10 is a controller for controlling the display of the display device 7. By controlling the display of the display device 7 with the first controller 10, a normal screen, a maintenance screen, and other types of screens, for example, may be displayed on the display device 7.

A second controller 13 for controlling the transmission is attached to the rear wall 411 of the box section 41 in a detachable manner. Specifically, the second controller 13 is attached to the rear wall 411 with fastening members (not illustrated), such as bolts and the like. The second controller 13 is disposed to the rear of the first console box 5a when attached to the rear wall 411.

A wire harness 14 for bundling wiring from the electronic components, such as the first controller 10, the relays 11, the fuses 12, and the second controller 13, extends below the floor section 42.

When storing the motor grader 1 configured as described above in a container, the box section 41 of the cab 4 is detached from the floor section 42 to reduce the dimension in the height direction. A state of the motor grader 1 when the box section 41 is detached is described next.

Figure 6:
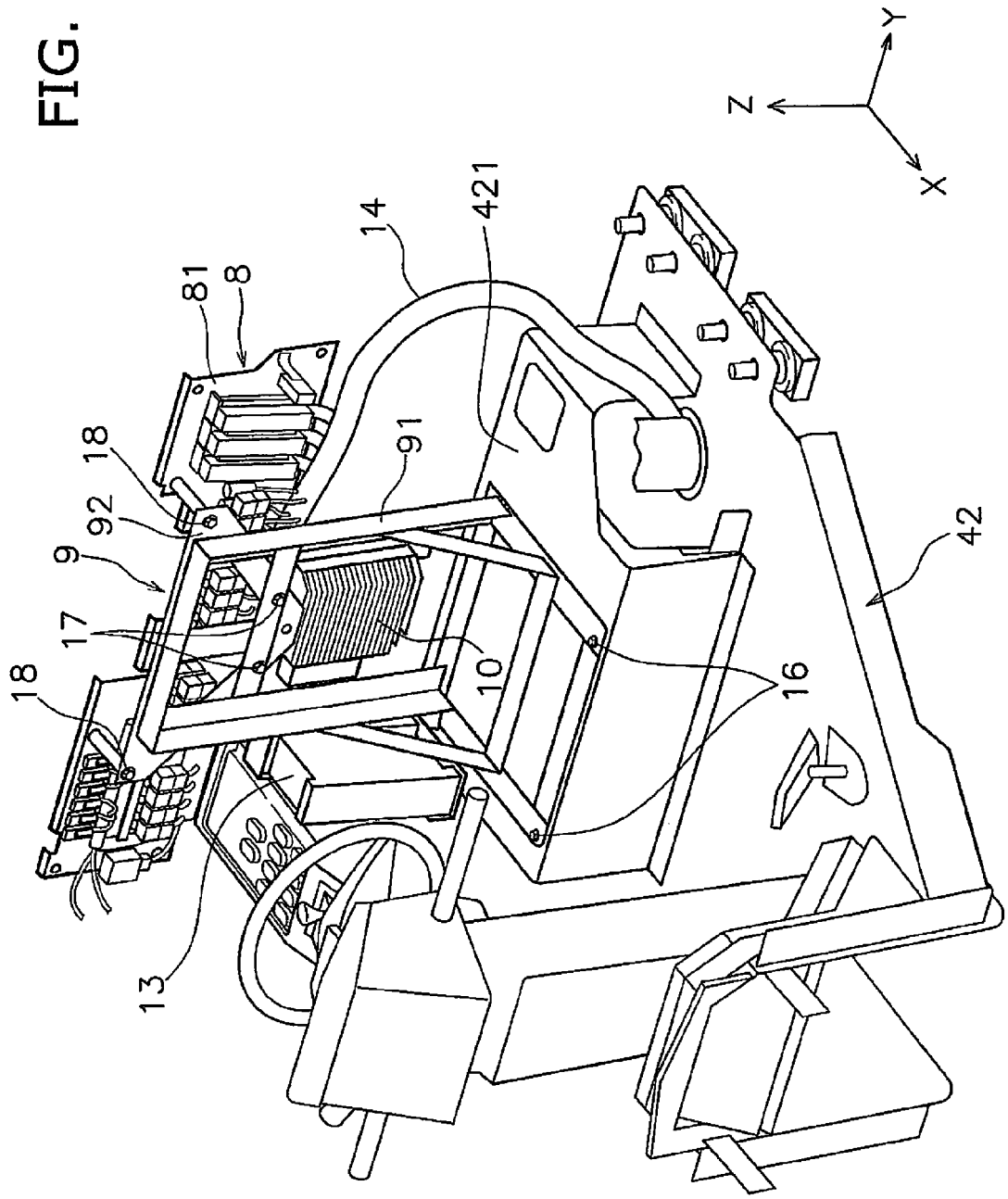
FIG. 6 is a perspective view illustrating details of the cab with the box section of the cab detached.

FIG. 6 is a perspective view illustrating details of the cab 4 in a state in which the box section 41 is detached. As illustrated in FIG. 6, a bracket (example of an attachment member) 9 is attached in a detachable manner to the seat section 421 of the floor section 42 with the seat 423 detached. The base member 8 is attached to the bracket 9 in a detachable manner. The following is a detailed description of the configuration.

Figure 7:
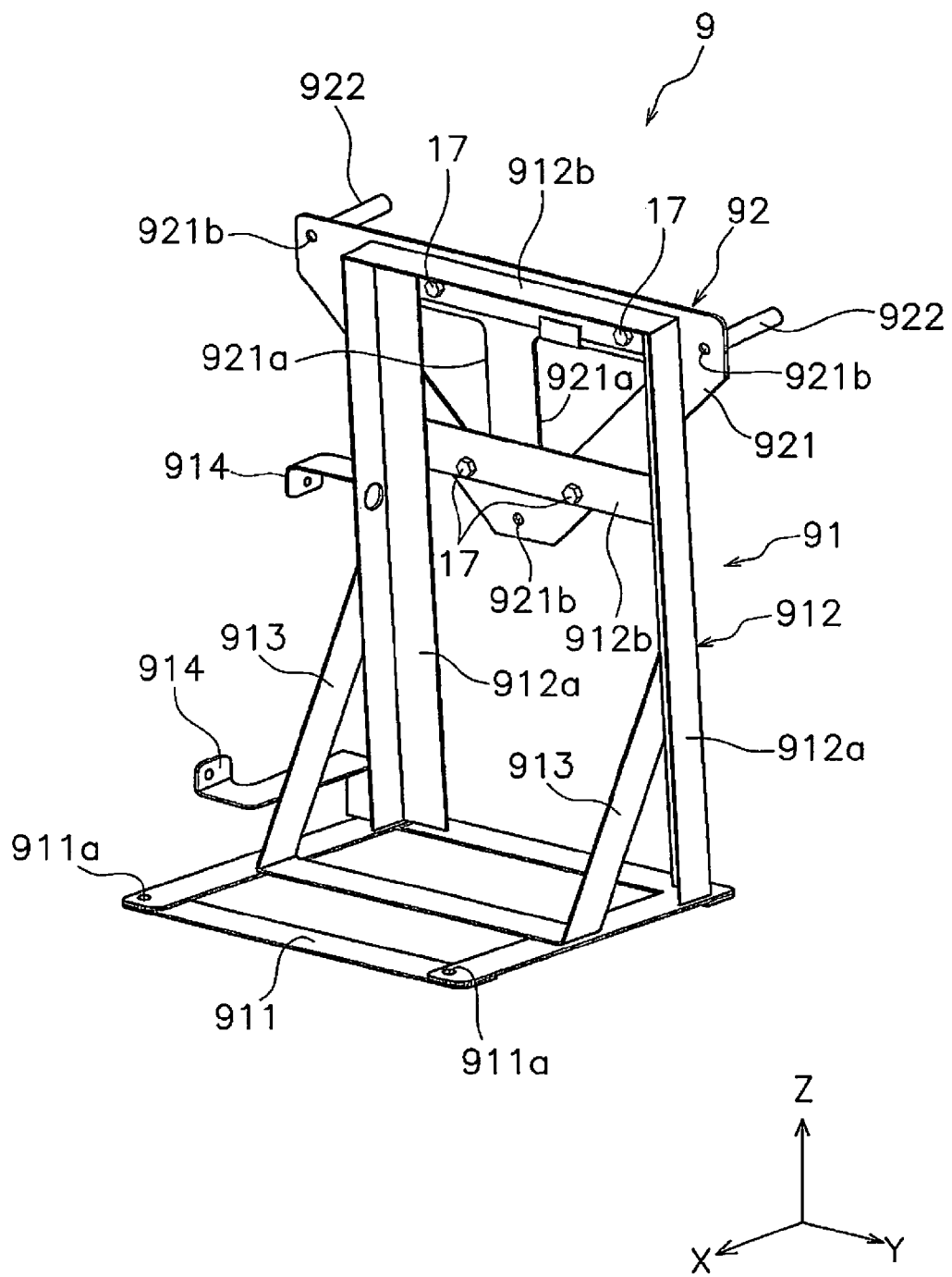
FIG. 7 is a front perspective view of a bracket in a state in which a second bracket member is attached to a first bracket member.
Figure 8:
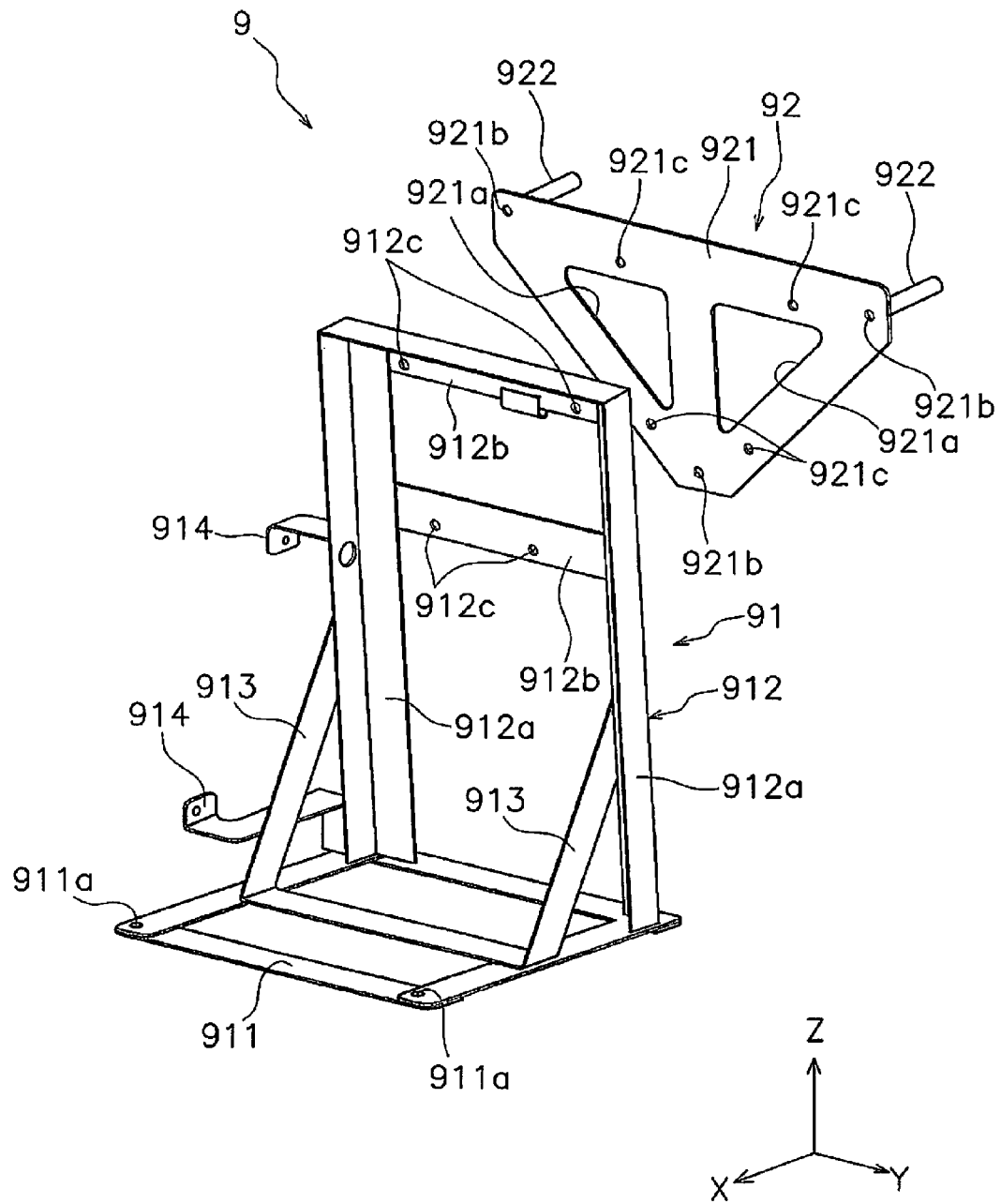
FIG. 8 is a front perspective view of a bracket in a state before the second bracket member is attached to the first bracket member.
Figure 9:
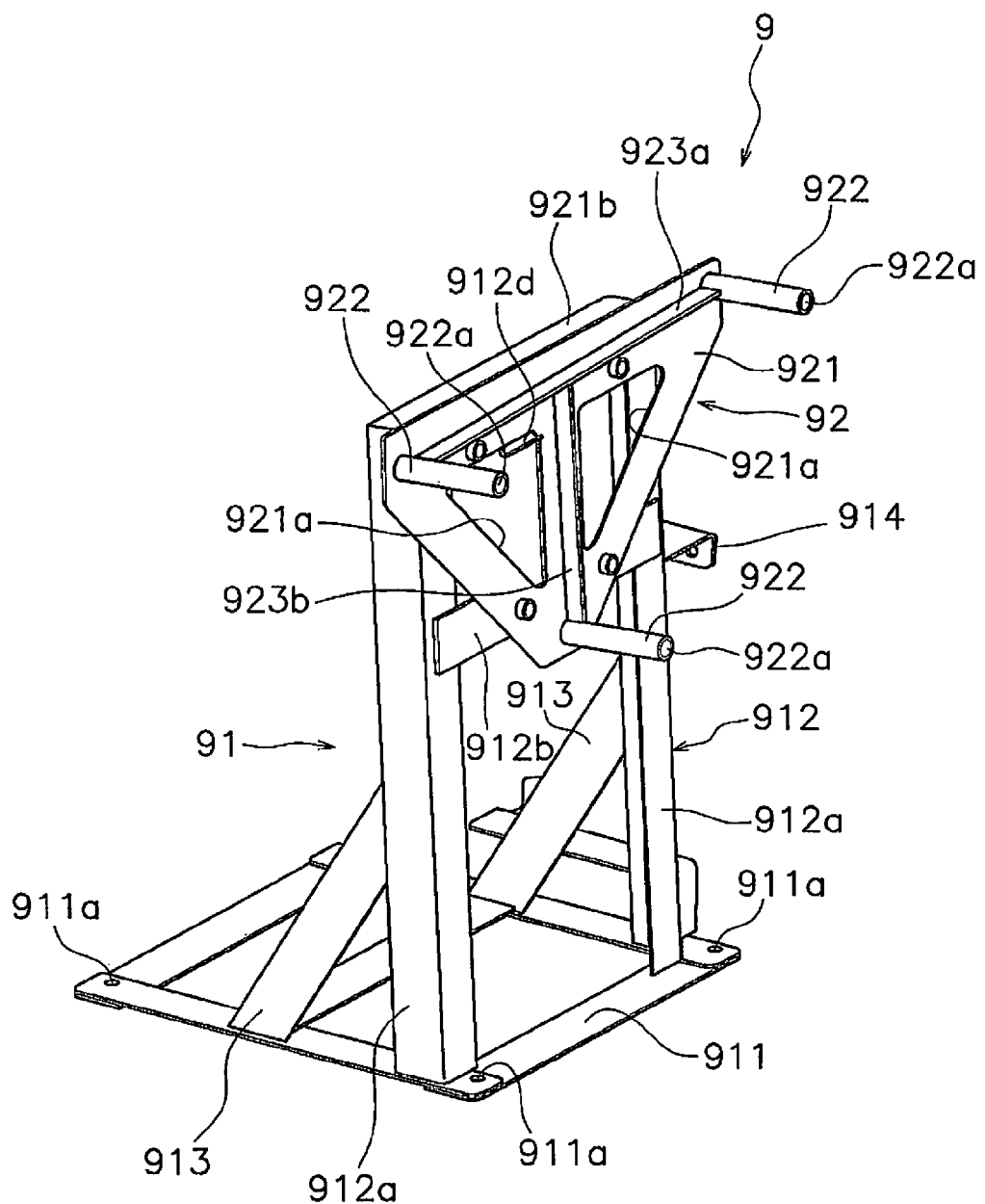
FIG. 9 is a rear perspective view of a bracket in a state in which the second bracket member is attached to the first bracket member.
Figure 10:
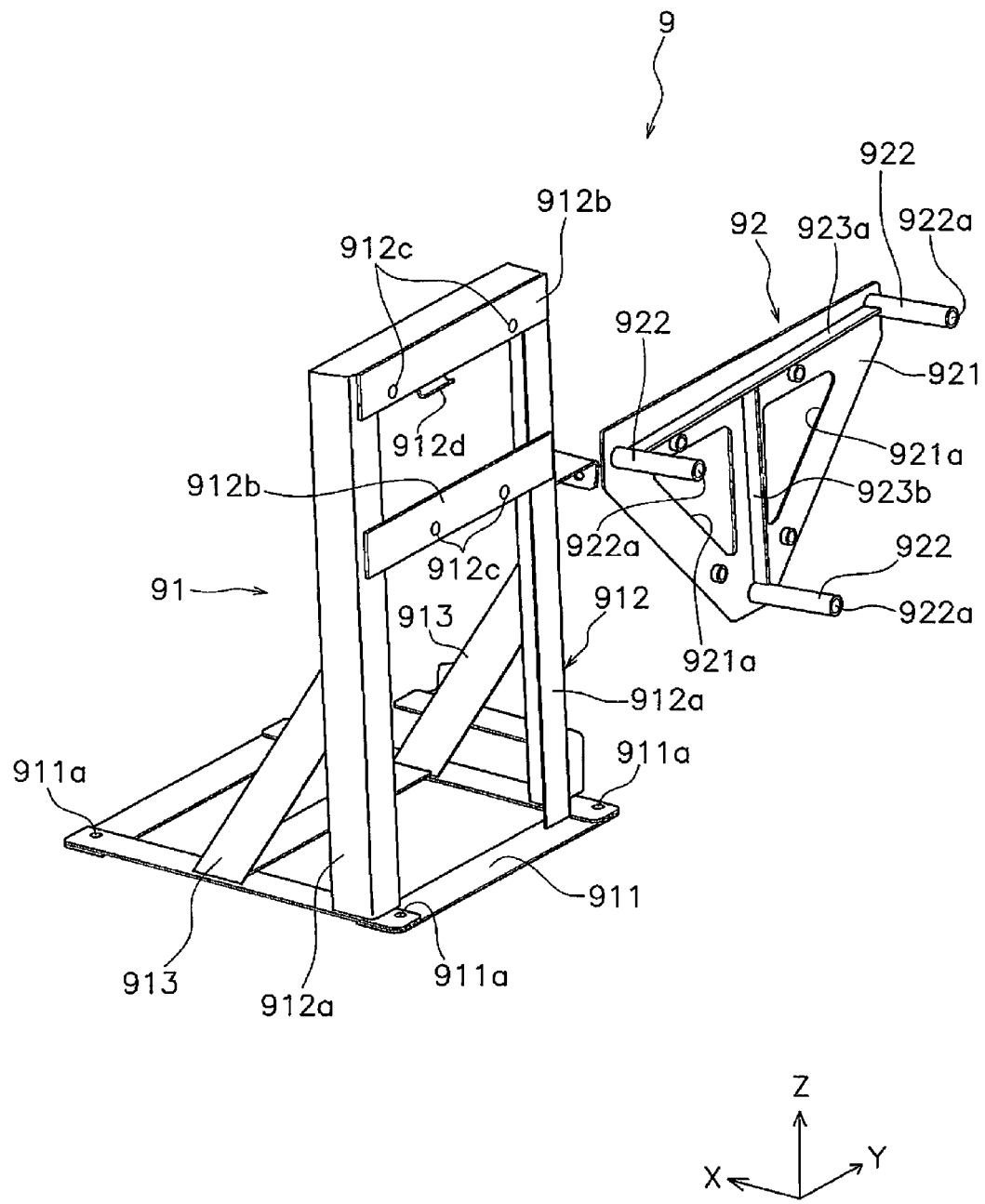
FIG. 10 is a rear perspective view of a bracket in a state before the second bracket member is attached to the first bracket member.

FIG. 7 is a perspective view as seen from the left front of the bracket 9 in a state in which a second bracket member 92 is attached to a first bracket member 91. FIG. 8 is a perspective view as seen from the left front of the bracket 9 in a state before the second bracket member 92 is attached to the first bracket member 91. FIG. 9 is a perspective view as seen from the left rear of the bracket 9 in a state in which the second bracket member 92 is attached to the first bracket member 91. FIG. 10 is a perspective view as seen from the left rear of the bracket 9 in a state before the second bracket member 92 is attached to the first bracket member 91.

As illustrated in FIGS. 7 to 10, the bracket 9 includes the first bracket member (example of a first member) 91 and the second bracket member (example of a second member) 92. The first bracket member 91 is a member that is attached in a detachable manner to the seat section 421 of the floor section 42 with fastening members, such as the bolts 16, as illustrated in FIG. 6. The first bracket member 91 is formed with a steel plate, and as illustrated in FIGS. 7 to 10, has a bottom section 911, a body section 912, a reinforcing section 913, and a holding part 914.

The bottom section 911 is formed as a rectangular frame and includes through-holes 911a formed in the four corners. The through-holes 911a are formed in positions corresponding to the threaded holes 422 formed in the seat section 421 of the floor section 42. By screwing the bolts 16 that pass through the through-holes 911a of the bottom plate 911 into the threaded holes 422 of the seat section 421, the first bracket member 91 is attached to the seat section 421 in a detachable manner as illustrated in FIG. 6.

The body section 912 extends upward from the rear edge part of the bottom section 911. The body section 912 is inclined so as to tilt forward. The body section 912 has two strut parts 912a that extend upward from the bottom section 911, and two coupling parts 912b that extend in the left-right direction to couple the strut parts 912a. The strut parts 912a and the coupling parts 912b may be formed in an integrated manner or may be formed as separate members. The strut parts 912a are inclined to tilt forward. The coupling parts 912b are disposed with a gap therebetween, and two through-holes 912c are formed in each of the coupling parts 912b. A hook 912d (example of a first engaging part) is formed on the upper side of the coupling part 912b, as shown in FIGS. 9 and 10. The second bracket member 92 may be hung onto the first bracket member 91 by using the hook 912d.

The reinforcing section 913 is formed to couple the bottom section 911 with the strut parts 912a of the body section 912. The fixing strength of the body section 912 to the bottom section 911 is increased by the reinforcing section 913.

The holding part 914 is a portion for holding the second controller 13 detached from the rear wall 411 and specifically holds an upper part and a lower part of the second controller 13. The holding part 914 is disposed on the right side of the body section 91.

As illustrated in FIG. 6, the second bracket member 92 is attached in a detachable manner onto the first bracket member 91 with fastening members, such as bolts 17. The base member 8 is attached in a detachable manner onto the second bracket member 92 with fastening members, such as bolts 18. The second bracket member 92 is formed of a steel plate, and as illustrated in FIGS. 7 to 10, has a body section 921, gripping parts 922, and first and second rib parts 923a and 923b.

The body section 921 has an inverse triangle shape and is formed with two opening parts 921a. The second bracket member 92 may be hung onto the hook 912d of the first bracket member 91 by using one of the opening parts 921a. Through-holes 921b are formed in each of a plurality (e.g., three) of vertex parts of the body section 921. A plurality (e.g., four) of threaded holes 921c are formed in positions corresponding to the through-holes 912c formed in the body section 912 of the first bracket member 91. The bolts 17 that pass through the through-holes 912c in the body section 912 of the first bracket member 91 are screwed into the threaded holes

921c. Consequently, the second bracket member 92 is attached in a detachable manner onto the first bracket member 91.

Figure 11:
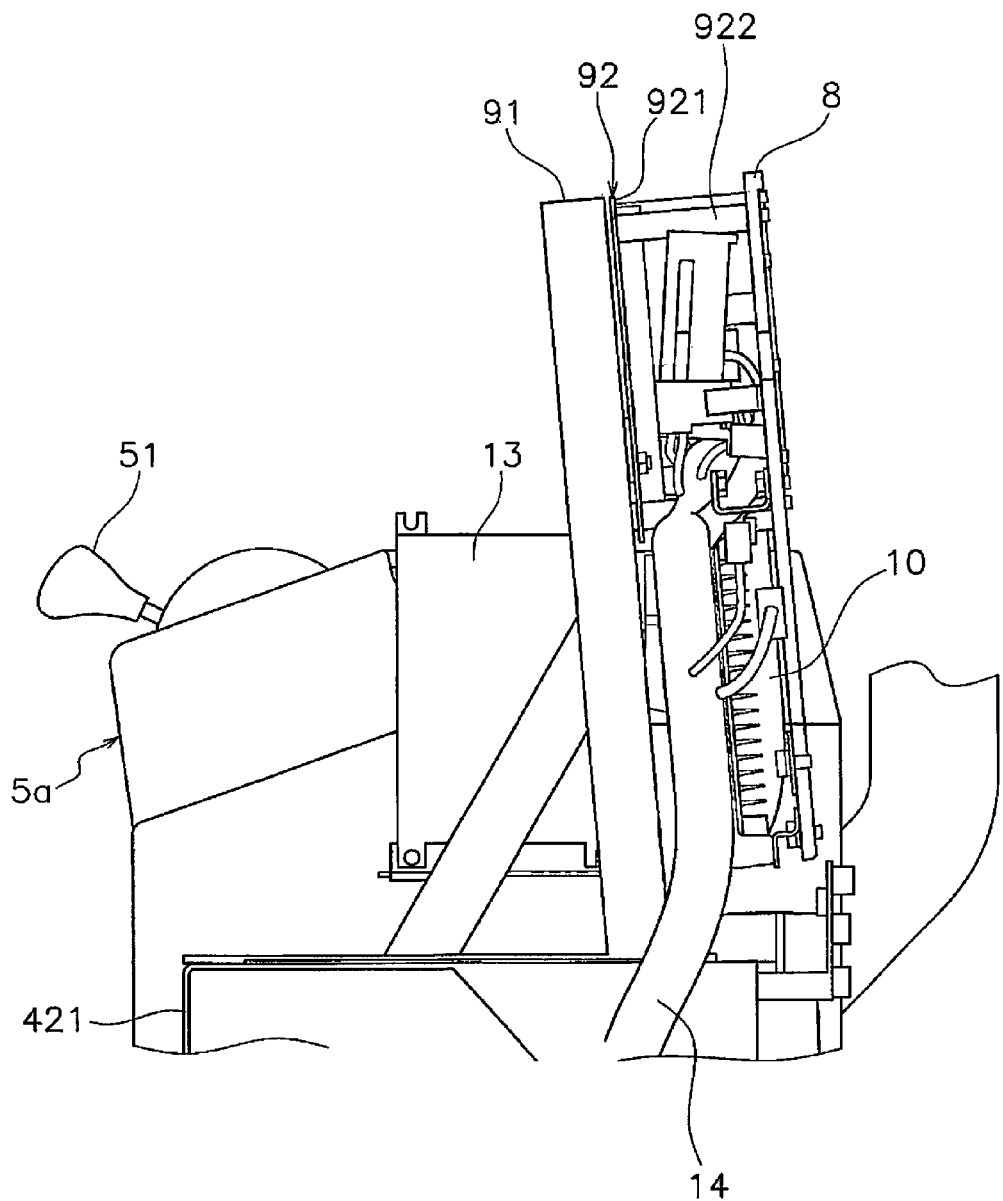
FIG. 11 is a partial side elevational view illustrating a state in which a base member is attached to a bracket.

A plurality of (e.g., three) rod-like gripping parts 922 extend to the rear from the vertex parts of the body section 921. The gripping parts 922 are cylindrical and the internal diameter of through-holes 922a are substantially the same as the internal diameter of the through-holes 921b in the body section 921. The through-holes 922a of the gripping parts 922 and the through-holes 921b of the body section 921 are disposed on the same axis. Specifically, the through-holes 922a of the gripping parts 922 and the through-holes 921b of the body section 921 are joined to form one through-hole. The base member 8 is attached to the second bracket member 92 in a detachable manner by screwing the bolts 18 that pass through the through-holes 922a of the gripping parts 922 and the through-holes 921b of the body section 921, into threaded holes 83 in the base member 8. In a state in which the base member 8 is attached to the second bracket member 92, the base member 8 is inclined so as to tilt forward as illustrated in FIG. 11. FIG. 11 is a partial side view illustrating a state in which the base member 8 is attached to the bracket 9.

First and second rib parts 923a and 923b are formed on the rear surface of the body section 921. Specifically, the first rib part 923a that extends in the left-right direction is formed to extend between the two gripping parts 922 provided in the upper part of the body section 921. The second rib part 932b that extends in the vertical direction is formed to extend between the first rib 923a and the gripping part 922 provided in the lower part of the body section 921. The body section 921 may be reinforced by the first and second rib parts 923a and 923b.

The following is a description of procedures when detaching the box section 41 of the motor grader 1 configured as described above to allow for a state of enabling travel.

First, the cab 4 is in the state illustrated in FIG. 3 when performing normal work with the motor grader 1. Specifically, the motor grader 1 is in a state in which the box section 41 is attached and the base member 8 to which the electronic components are fixed is attached to the rear wall 411 of the box section 41. When detaching the box section 41 of the cab 4 to store the motor grader 1 in a container, the seat 423 (see FIG. 5) on the seat section 421 of the floor section 42 is detached first. The first bracket member 91 of the bracket 9 is then attached to the seat section 421 to which the seat 423 is attached. The attachment of the first bracket member 91 may make use of the threaded holes 422 that are used for the attachment of the seat 423. Specifically, by passing the bolts 16 through the through-holes 911a of the first bracket member 91 and screwing the bolts 16 into the threaded holes 422 of the seat section 421, the first bracket member 91 is attached to the seat section 421.

Next, the second bracket member 92 is prepared and the bolts 18 are passed through the through-holes 922a of the gripping parts 922 and the through-holes 921b of the body section 921 of the second bracket member 92. The bolts 18 are screwed into the threaded holes 83 of the base member 8 so that the second bracket member 92 is attached to the base member 8.

Next, the base member 8 is detached from the rear wall 411 of the box section 41. Specifically, the base member is detached from the rear wall 411 by detaching the bolts 15 from threaded holes (not illustrated) in the rear wall 411. At this time, the work to detach the base member 8 may be performed more easily by performing the work while the worker holds the gripping parts 922 of the second bracket member 92.

The base member 8 detached from the rear wall 411 is attached to the first bracket member 91. Specifically, the second bracket member 92, to which the base member 8 is attached, is attached to the first bracket member 91. That is, the bolts 17 are passed through the through-holes 912c of the first bracket member 91 and the bolts 17 are screwed into the threaded holes 921c of the second bracket member 92. Consequently, the second bracket member 92 is attached to the first bracket member 91. When attaching the second bracket member 92 to the first bracket member 91, the second bracket member 92 is hung onto the first bracket member 91 by using the hook 912d of the first bracket member 91 and thus the work to attach the second bracket member 92 to the first bracket member 91 may be performed more easily.

The second controller 13 is detached from the rear wall 411 and held by the holding part 914 of the first bracket member 91. The box section 41 from which the electronic components have been detached in this way is detached from the floor section 42. As described above, when the motor grader 1 enters a state in which the box section 41 is detached as illustrated in FIG. 6, travel of the motor grader 1 is enabled because the electronic components, such as the first controller 10 and the second controller 13, which are controllers for controlling equipment required for travel, remain on the floor section 42. Consequently, the motor grader 1 in which the box section 41 is detached is enabled to travel and may be stored inside a container.

The motor grader 1 according to exemplary embodiments of the present embodiment has the following features.

The box section 41 of the cab 4 is detachable in the motor grader 1 according to the above exemplary embodiment. The bracket 9 is attached to the floor section 42 and the base member 8 having the first controller 10 attached thereto may be attached to the bracket 9 in the motor grader 1 in the state in which the box section 41 is detached. As a result, travel of the motor grader 1 is enabled even when the box section 41 is detached. Consequently, because travel of the motor grader 1 is enabled even when the box section 41 is detached to store the motor grader 1 in a container, for example, the efficiency of work to store the motor grader 1 in the container may be improved.

Because the base member 8 is attached to the box section 41 in a state in which the box section 41 is attached to the motor grader 1, a plurality of controllers required for enabling the motor grader 1 to travel may be provided regardless of the storage capacity of the console boxes 5a and 5b.

The bracket 9 is attached to the floor section 42 with the bolts 16. As a result, work to attach or detach the bracket 9 to or from the floor section 42 may be performed more easily.

The base member 8 is attached to the bracket 9 with the bolts 18. As a result, work to attach or detach the base member 8 to or from the bracket 9 may be performed easily.

Because the second bracket member 92 is attached to the first bracket member 91 with the bolts 17, work to attach or detach the second bracket member 92 to or from the first bracket member 91 may be performed easily.

The second bracket member 92 has the gripping parts 922 for a worker to grip the second bracket member 92. As a result, workability for detaching the base member 8 attached to the rear wall 411 of the box section 41 from the rear wall 411 and attaching the base member 8 to the bracket 9 is improved. Specifically, when the second bracket member 92 is attached to the base member 8 attached to the rear wall 411 and the second bracket member 92 to which the base member 8 is attached is attached to the first bracket member 91, a worker is able to perform work while gripping the gripping parts 922 to hold the second bracket member 92.

The gap between the body section 921 of the second bracket member 92 and the base member 8 is maintained because the gripping parts 922 extend between the body section 921 of the second bracket member 92 and the base member 8. As a result, damage due to the first controller 10 fixed onto the base member 8 or to the harness 14 extending from the first controller 10 colliding with the body section 921 of the second member 92 and the like may be prevented even when vibration occurs due to travel of the motor grader 1.

The first bracket member 91 is inclined to tilt forward. As a result, when lifting the box section 41 upward to detach the box section 41, interference between the lower end part 412 of the rear wall 411 of the box section 41 and the base member 8 attached to the bracket 9 may be avoided.

The first bracket member 91 has the hook 912d for hanging the second bracket member 92. As a result, work to attach the second bracket member 92 to the first bracket member 91 may be performed more easily in a state in which the second bracket member 92 is hanging on the first bracket member 91.

The second controller 13 for controlling equipment required for travel is provided, and the first bracket member 91 has a holding part 914 for holding the second controller 13. The second controller 13 is not attached to the base member 8 since the second controller 13 is attached to the rear wall 411 behind the first console box 5a in a detachable manner when the box section 41 is attached. Because the second controller 13 and the first console box 5a may interfere with each other when the second controller 13 is temporarily fixed to the base member 8 in the same way as the other electronic components, the base member cannot be attached to the bracket 9 in a state of being tilted forward. As a result, when the box section 41 is detached, there is a concern that interference with the lower end part 412 of the rear wall 411 of the box section 41 may occur. Accordingly, in the above exemplary embodiment, because the second controller 13 is not attached to the base member 8, the base member 8 may be attached to the bracket 9 in a state of being tilted forward. Consequently, interference between the base member 8 and the lower end part 412 of the rear wall 411 of the box section 41 may be avoided when detaching the box section 41. The second controller 13 may be kept at the floor section 42 side by allowing the second controller 13 to be held on the holding part 914 of the first bracket member 91.

The upper edge part 811 of the upper plate part 81 of the base member 8 is folded to the rear and is configured to be hung on a convex part (not illustrated) that extends in the left-right direction formed on the rear wall 411. As a result, work when attaching the base member 8 to the rear wall 411 of the box section 41 may be performed easily.

While an exemplary embodiment of the present invention is described above, the present invention is not limited to the embodiment and the following modifications may be made within the scope of the present invention.

Figure 12:
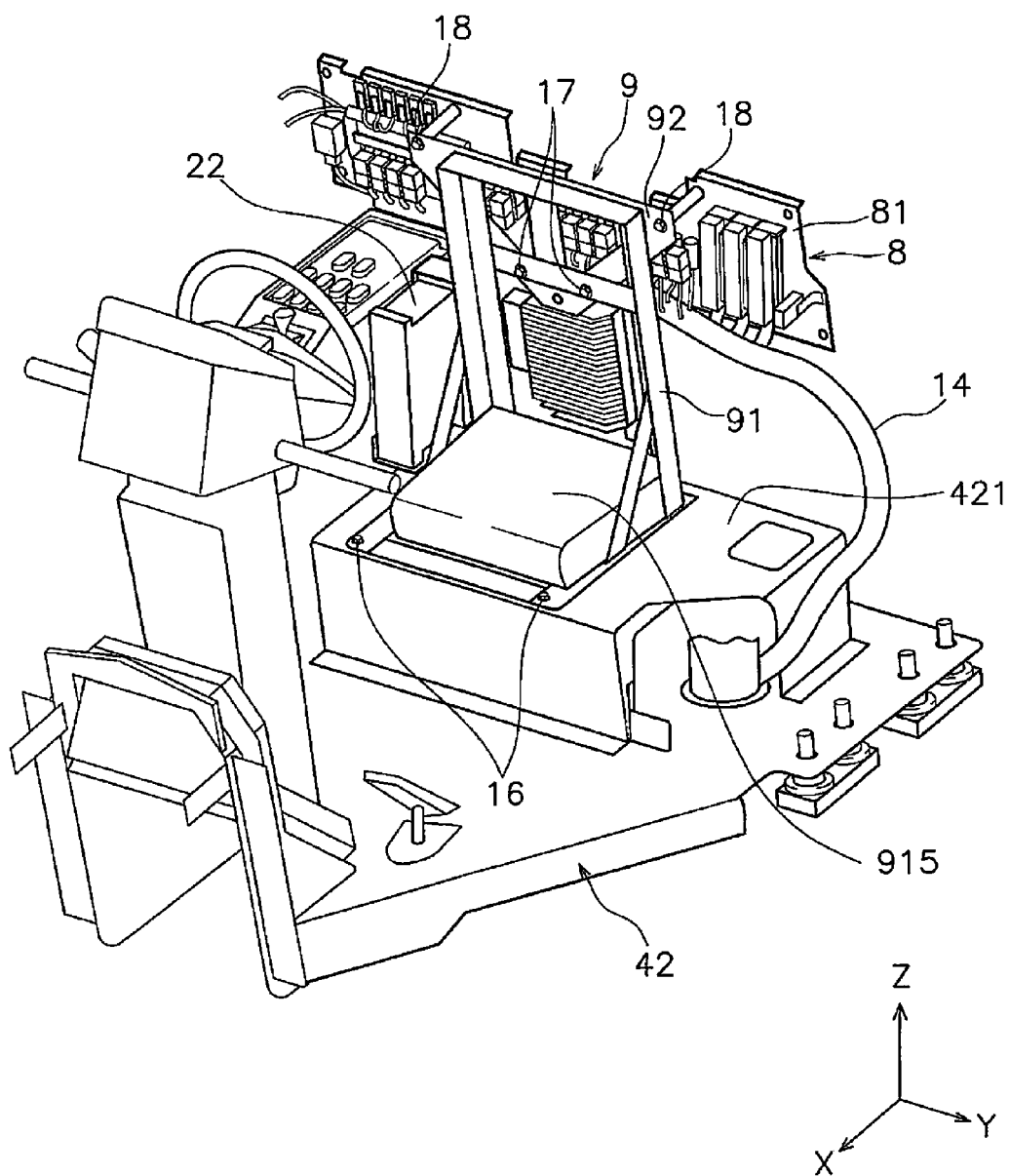
FIG. 12 is a perspective view illustrating details of a cab according to another exemplary embodiment of the present invention.

FIG. 12 is a perspective view illustrating details of a cab in which a box section has been detached according to another exemplary embodiment. As illustrated in FIG. 12, the first bracket member 91 may be provided with a temporary seat 915. By further providing the temporary seat 915, a worker is able to drive the motor grader 1 with the box section 41 detached in a sitting state.

While the bracket 9 in the above exemplary embodiment is configured from two members including the first bracket member 91 and the second bracket member 92, the present invention is not limited as such. For example, the bracket 9 may be configured from one member. Specifically, the bracket 9 may be configured so that the base member 8 is attached directly to the first bracket member 91.

While threaded holes are formed in the seat section 421, the base member 8, and the second bracket member 92 in the above exemplary embodiment, the present invention is not limited as such. For example, the members may be provided with through-holes instead of the threaded holes, and nuts may be prepared separately.

While an example of the motor grader 1 applicable to the present invention has been described in the above exemplary embodiment, the work vehicle applicable to the present invention is not limited to the motor grader 1. For example, the present invention may be applied to a hydraulic excavator, a bulldozer, or a wheel loader and the like.

While the hook 912d is formed as an example of an engaging part of the first bracket member 91 in the above exemplary embodiment, the present invention is not limited as such. For example, an engaging part may be formed on the second bracket member 92 and the engaging part of the second bracket member 92 may be used for hanging the second bracket member 92 on the first bracket member 91.

What is claimed is:

1. A work vehicle, comprising:
a cab having a box section and a floor section, the box section having a lower face that is open, the box section being detachably attached to the floor section such that the floor section closes the lower face of the box section;
a first controller that controls equipment required for travel;
a base member to which the first controller is attached, the base member being attached in a detachable manner to a rear wall of the box section inside the cab;
a second controller attached to the rear wall of the box section;
an attachment member that is detachably attachable to the floor section, the attachment member being configured to be attached to an attachment part of the base member such that the base member can be detached from the rear wall and attached to the attachment member with the first controller remaining attached to the base member.

2. The work vehicle according to claim 1, wherein the attachment member includes
a first member attachable to the floor section, and
a second member having a plate-like body section and at least two attachment parts for attachment with the base member, the attachment parts being arranged with a gap therebetween, the second member being attachable to the first member.

3. The work vehicle according to claim 2, wherein the second member is attached to the first member with a fastening member.

4. The work vehicle according to claim 2, wherein the second member includes a gripping part provided on the body section.

5. The work vehicle according to claim 4, wherein the gripping part extends from the body section toward the base member and is coupled to the base member at a distal end part.

6. The work vehicle according to claim 2, wherein the first member has a body section that is tilted forward when attached to the floor section.

7. The work vehicle according to claim 2, wherein one of the first member and the second member has a first engaging part for engaging the one of first member and the second member with the other of the first member and the second member.

8. The work vehicle according to claim 2, wherein the first member has a holding part for holding the second controller.

9. The work vehicle according to claim 8, wherein the attachment member is configured such that, while the attachment member is attached to the seat section of the floor section, the holding part is arranged to hold the second controller on one lateral side of the attachment member with the second controller oriented in a different direction than when the second controller is attached to the rear wall.

10. The work vehicle according to claim 2, wherein the first member has a seat.

11. The work vehicle according to claim 1, wherein the base member has a second engaging part for engaging the box section.

12. The work vehicle according to claim 1, wherein the base member is attached to the attachment member with a fastening member.

13. The work vehicle according to claim 1, wherein the second controller controls equipment required for travel.

14. The work vehicle according to claim 1, wherein the attachment member is attachable to the floor section with a fastening member.

15. A work vehicle, comprising:
a cab having a box section having a lower surface that is open, and a floor section that closes the lower surface of the box section;
a seat installed in a detachable manner on a seat section of the floor section;
a first controller controlling equipment required for travel;
a base member to which the first controller is attached, the base member being attached in a detachable manner to a rear wall of the box section inside the cab;
an attachment member attachable to the seat section of the floor section when the seat is removed from the floor section; and
the base member having an attachment part for attaching the base member to the attachment member.

16. The work vehicle according to claim 15, wherein the base member is attached to the rear wall of the box section with a fastening member.

17. The work vehicle according to claim 15, wherein the seat section includes a seat attachment structure, and each of the seat and the attachment member is configured to be attached to the seat attachment structure.

18. The work vehicle according to claim 17, wherein the seat attachment structure includes at least one threaded hole formed in the floor section, and
each of the seat and the attachment member includes at least one through hole configured and arranged to be aligned with the at least one threaded hole when the seat or the attachment member is attached to the seat section of the floor section.

19. The work vehicle according to claim 18, further comprising
a second controller detachably attached directly to the rear wall of the box section,
the attachment member including a holding part configured for the second controller to be attached when the second controller is detached from the rear wall of the box section.

20. A method for enabling travel of a work vehicle in a state in which a box section is detached, the work vehicle comprising:
a cab having a box section with a lower surface that is open, and a floor section that closes the lower surface of the box section;
a seat installed in a detachable manner on the floor section;
a first controller that controls equipment required for travel;
a base member to which the first controller is attached, the base member being attached in a detachable manner to a rear wall of the box section inside the cab;
the method including
detaching the seat;
attaching an attachment member to the floor section from which the seat was detached;
detaching the base member from the rear wall of the box section;
attaching the detached base member to the attachment member; and
detaching the box section after the base member has been detached.

* * * * *